Figure 1:
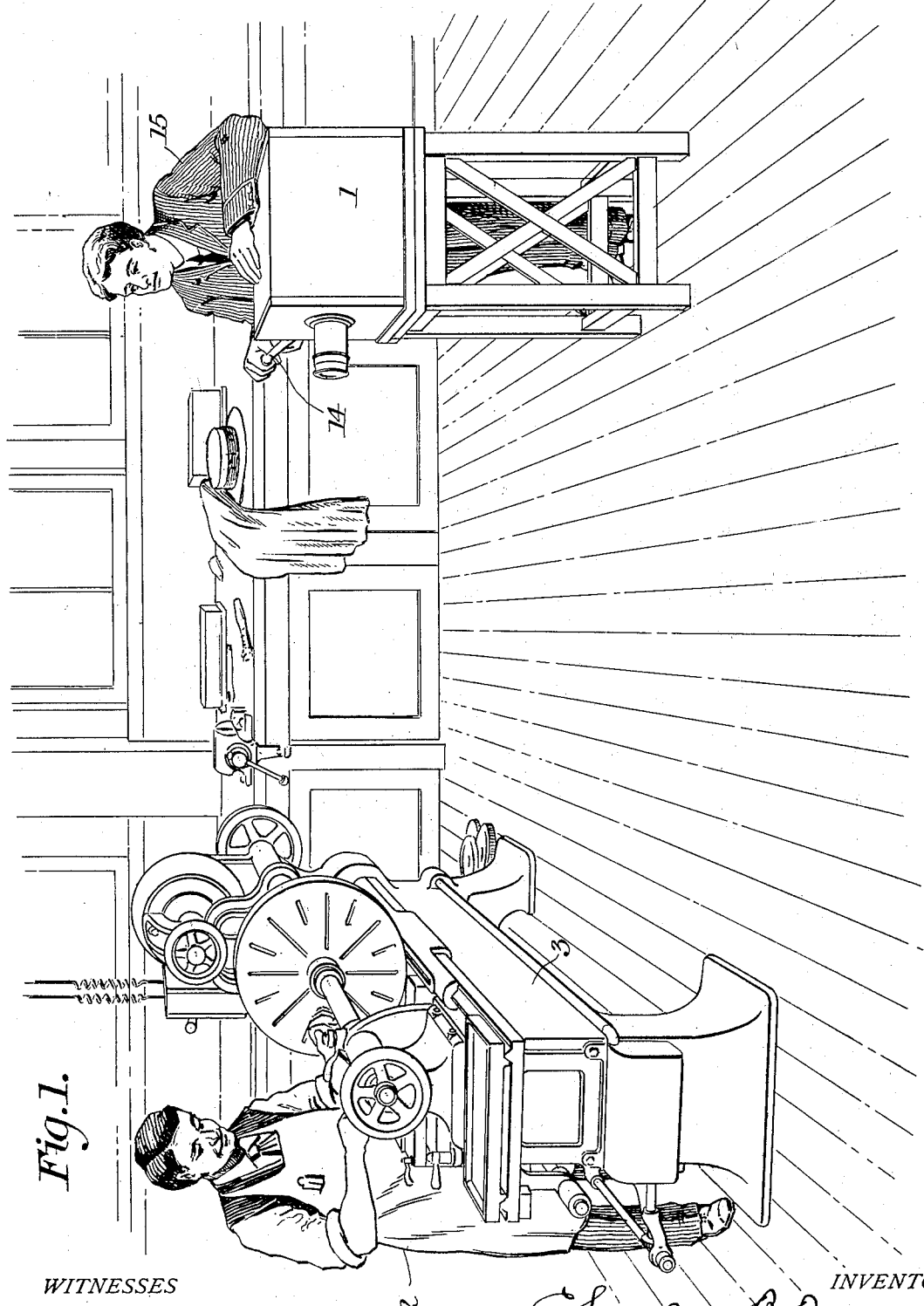

C. B. BREWER.
METHOD OF SHOP MANAGEMENT.
APPLICATION FILED JULY 28, 1911.

1,033,773.

Patented July 23, 1912.
5 SHEETS—SHEET 1.

WITNESSES
N. F. Barnes.
James Atkins

INVENTOR
Charles B. Brewer
by Edmund H. Par—
Attorney

C. B. BREWER.
METHOD OF SHOP MANAGEMENT.
APPLICATION FILED JULY 28, 1911.

1,033,773.

Patented July 23, 1912.

5 SHEETS—SHEET 2.

WITNESSES

INVENTOR

C. B. BREWER.
METHOD OF SHOP MANAGEMENT.
APPLICATION FILED JULY 28, 1911.
1,033,773.
Patented July 23, 1912.
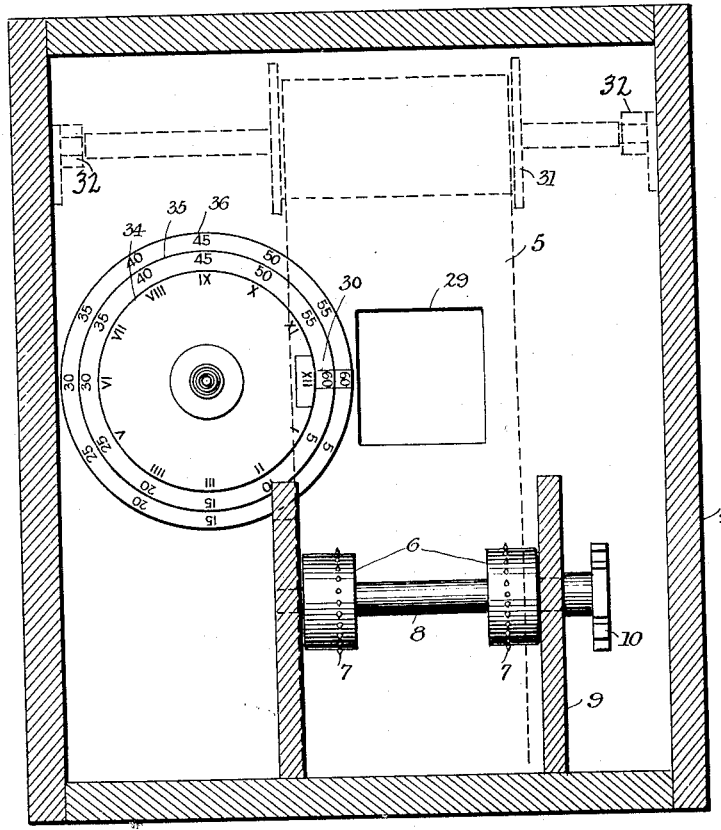
Fig. 4.
Fig. 7.
Fig. 8.
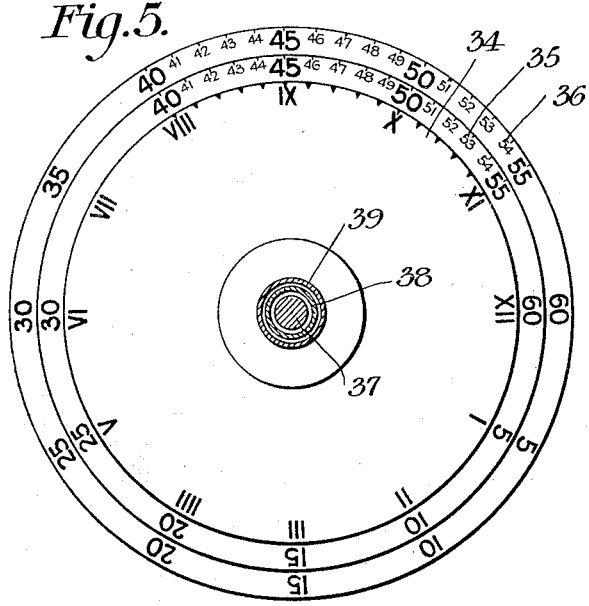
Fig. 5.
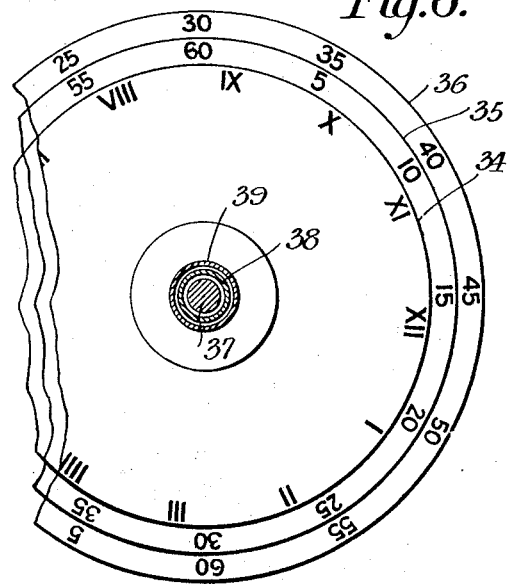
Fig. 6.
WITNESSES
R. F. Barns.
James Atkins
INVENTOR
Charles B. Brewer,
by Edmund H. Parry
Attorney C. B. BREWER.
METHOD OF SHOP MANAGEMENT.
APPLICATION FILED JULY 28, 1911.
1,033,773.
Patented July 23, 1912.
5 SHEETS—SHEET 4.
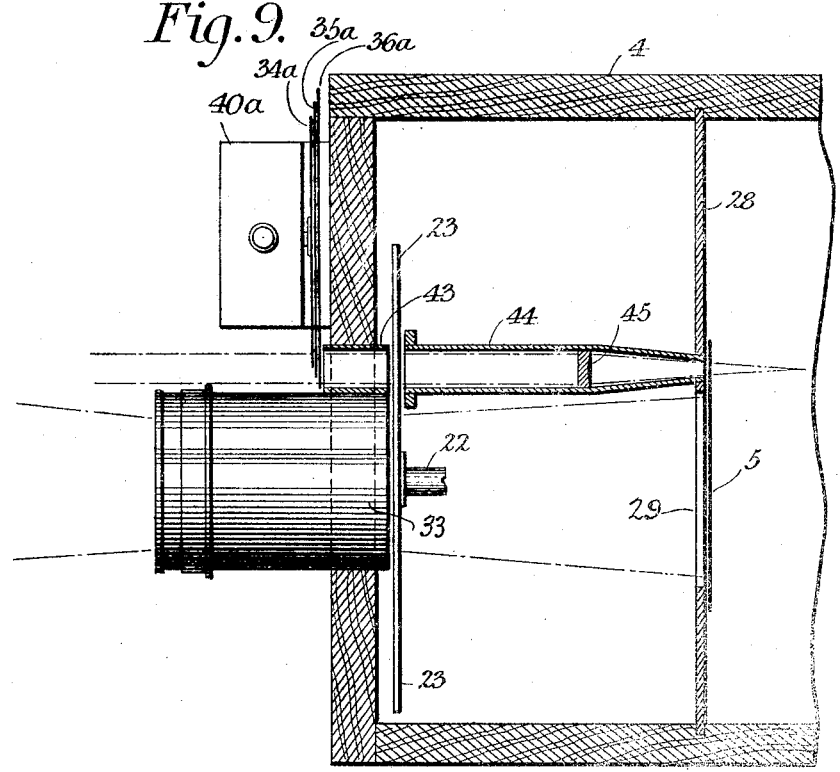
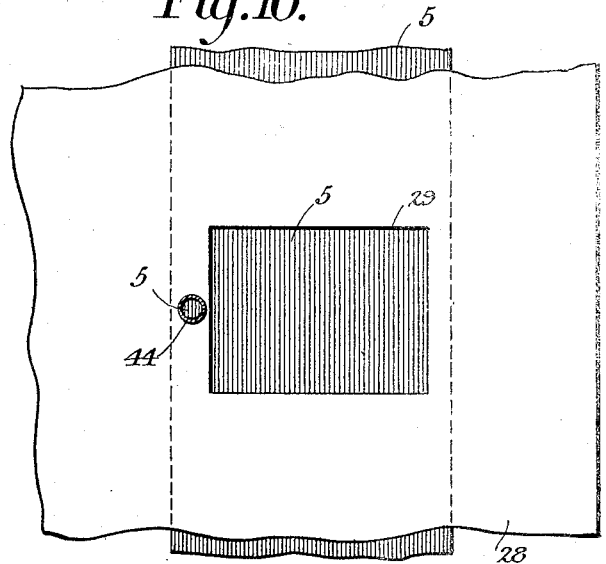
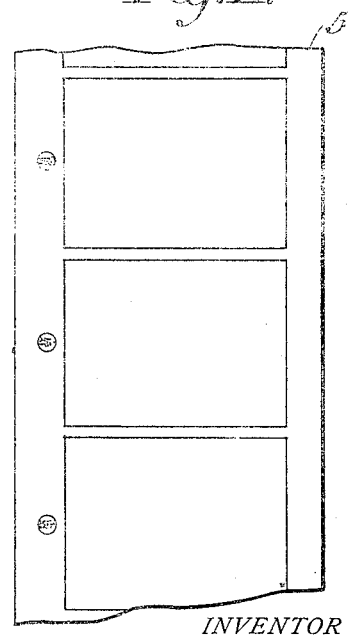
WITNESSES
INVENTOR

C. B. BREWER.
METHOD OF SHOP MANAGEMENT.
APPLICATION FILED JULY 28, 1911.

1,033,773.

Patented July 23, 1912.
5 SHEETS—SHEET 5.

WITNESSES
P. J. Barnes.
James Atkins.

INVENTOR
Charles B. Brewer,
by Edmund H. Parry
Attorney

UNITED STATES PATENT OFFICE.

CHARLES B. BREWER, OF HYATTSVILLE, MARYLAND.

METHOD OF SHOP MANAGEMENT.

1,033,773.  Specification of Letters Patent.  Patented July 23, 1912.

Application filed July 28, 1911. Serial No. 641,023.

*To all whom it may concern:*

Be it known that I, CHARLES B. BREWER, a citizen of the United States, residing at Hyattsville, in the county of Prince George and State of Maryland, have invented certain new and useful Improvements in Methods of Shop Management, of which the following is a specification, reference being had therein to the accompanying drawing.

This invention relates to a method to be used in connection with shop management; that is, to a method to be utilized in connection with scientific management in shops, offices, and the like; and includes instrumentalities for carrying the same into practice.

There has lately come into vogue a method of improving systems of work in large establishments, and particularly in manufacturing plants. To the end that proper observation of existing methods may be made, the services of a shop management expert are enlisted, and he spends as much time as may be necessary in the shop or factory, first observing, and then analyzing, the different steps and actions for performing certain operations. At the same time, he takes note of the time that it may be necessary to perform each step or operation in order that a proper basis of comparison with similar operations of different workmen or factories may be determined; and the results of these analyses, observations, and comparisons are subsequently utilized by the expert for the purpose of devising improved methods of carrying out the shop operations on a more economical plan, as well as means for reducing the time required for performing the observed operations, and for eliminating all unnecessary or useless operations and also economically adjusting methods and equipment. By reason of the fact that the analyses or conclusions of the shop management expert are necessarily based on observations, made while the different operations are being carried out in the shops,—which operations are thus liable at times to be detrimentally affected by confusion, noise, and the rapidity with which certain operations or movements are necessarily performed—it has been found in actual practice that errors and inaccuracies due to the human equation have occurred, and this has necessitated repetition of observations in order to secure accurate results, because the proper and methodical precision which shop management experts seek to attain render observations unreliable where the human eye is relied upon to note the operation and the time it takes to perform the same, technically known as "unit time".

The primary objects of my invention are to eliminate the human equation in securing "unit times" for shop management methods, to widen the field of those capable of securing this data, and to provide permanent, actual records for subsequent comparison. To this end, I have devised a method for use in connection with shop management, which consists in successively photographing the successive movements or operations to be examined and simultaneously measuring and effecting an indication of the elapsed time of or between such successive movements or operations. To carry out this method I have also devised instrumentalities whereby such method can be practised with a certainty of accurate results, since, by these instrumentalities, computation is rendered unnecessary. While it is obvious that such instrumentalities may be of a varied character, yet, for the purpose of exemplifying a preferred form of apparatus for carrying my invention into practice, I have herein disclosed, principally, a plurality of structures all coöperating to produce the desired results, namely, (1), the successive photographing of successive movements or operations, and (2) simultaneously measuring and effecting an indication of the measured elapsed time of or between the successive movements or operations.

In an application of mine, now pending, Serial No. 577,873, I have disclosed a method and apparatus similarly to be used in connection with shop management, the same having for its object that which characterizes my present invention. The subject-matter of that application, however, lacks one element which is included in the invention of the present case, and that is a means for measuring and then indicating the elapsed time of or between the successive movements or operations. By the method disclosed in my said other application, it is necessary for the shop management expert to compute the elapsed time between the beginning and ending of a movement or operation or the succession of a series of movements or operations. In that no means are provided for effecting a measurement of the elapsed time, without computation, the subject-matter of my said application lacks that which I now deem important in such a method for use in connection with shop management.

In the accompanying drawings I have illustrated embodiments of my invention, the same being shown by way of example more clearly to illustrate the general plan I contemplate. It will be obvious, of course, that I am not confined to these particular embodiments, since any other appropriate instrumentality or set of instrumentalities may be utilized for the purpose.

Figure 2:
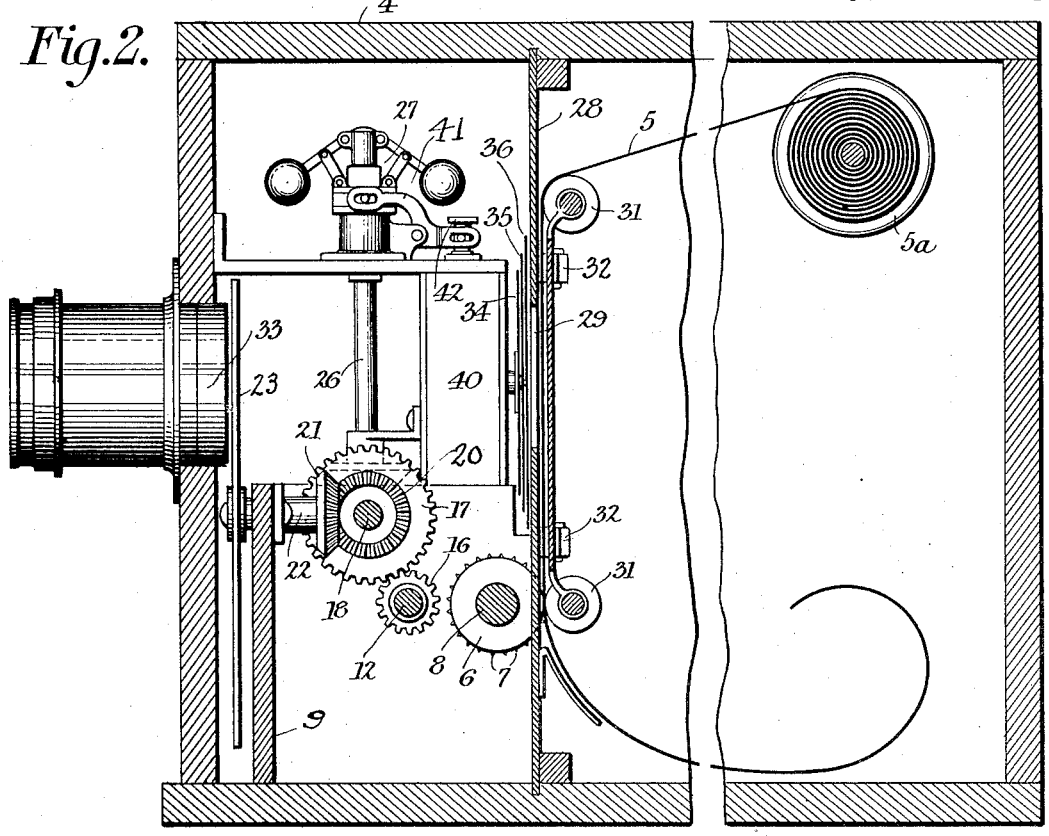
Figure 3:
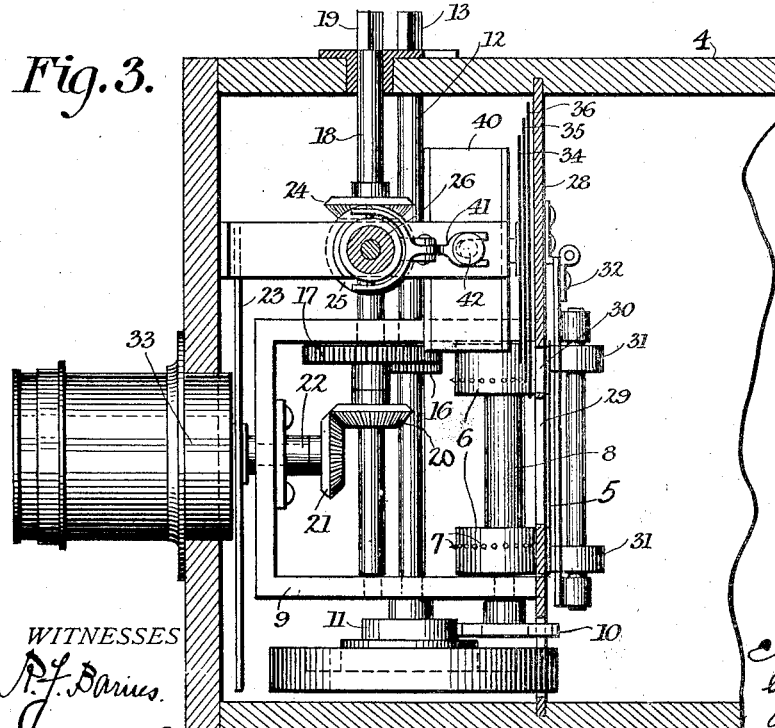
Figure 12:
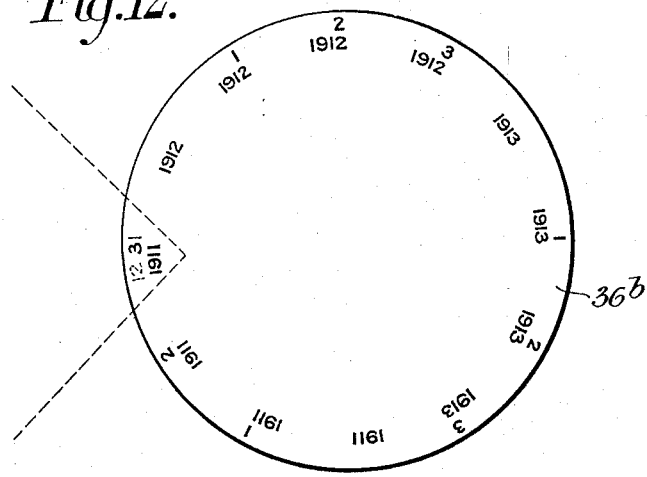
Figure 13:
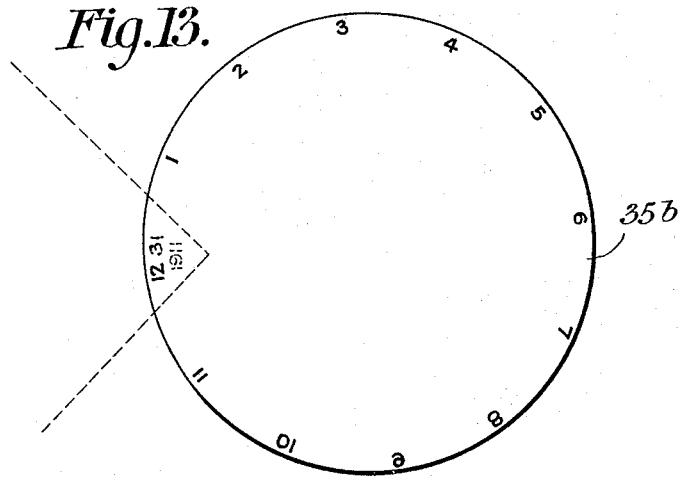
Figure 14:
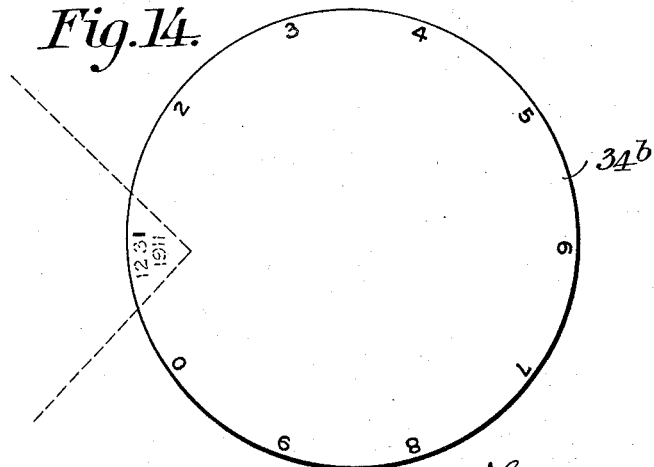

In the drawings: Figure 1 is a perspective view of the interior of a shop, in which the movements and operations of a workman at a lathe are being observed, measured, and indicated by kinematograph apparatus arranged in juxtaposition to the lathe and workman; Fig. 2 is an enlarged elevational view, partly in section, of a combined photograph, measuring and indicating mechanism which I have devised for carrying my method into effect; Fig. 3 is a view in horizontal section of the measuring and indicating-mechanism thereof; Fig. 4 is a fragmentary view in sectional elevation of the same, showing, particularly, the dials, constituting a part of the measuring and indicating-mechanism; Figs. 5 and 6 are enlarged views of the transparent dials or disks, bearing, respectively, hour, minute and second indications; Figs. 7 and 8 are fragmentary views of the film upon which time-indications have been produced by the apparatus; Fig. 9 is a view in section of a camera with a modified form of structure embodied therein to effect a production of time-indications on the film; Fig. 10 is a fragmentary view of the partition-plate of a camera, with a film disposed back of the same in the manner contemplated in the embodiment of my invention illustrated in Fig. 9; Fig. 11 is a fragmentary view of a film with time-indications shown as produced thereon by the apparatus shown in said Fig. 9; and Figs. 12, 13 and 14 are views of a modified form of structure, showing, on an enlarged scale, a set of disks or dials to be disposed in a camera and which carry indices of the year, month, day, etc.

Referring to the drawings, the reference-numeral 1 designates, in general, the apparatus forming an essential part of the set of instrumentalities utilized by me in practising my method, and, in this instance, shown as a kinematograph machine, whereby the successive photographs are taken; 2 indicates the workman whose method of performing certain operations are to be observed and analyzed; and 3 indicates a machine—in this instance, a lathe—at which he is working.

For the purposes of my invention, my preferred form of camera or kinematographic machine may be employed, and the one I have herein illustrated is merely an example of such a machine, in which the time-producing instrumentalities, presently to be described, are shown in a suitable position to effect the desired results. As the construction of the camera, per se, is well-known, it is not essential that it be described in detail. It comprises, in general, a casing 4, within which is housed a film 5, supported on reels 5ª and adapted to be intermittently actuated in any preferred manner. As a suitable form thereof, I may employ that shown in the drawings, the same comprising a pair of film-feed wheels 6, 6, provided as usual with projections or points 7 adapted to engage and move the film. These wheels are fast on a short shaft 8, suitably journaled in a supporting-frame 9, and upon one end of which shaft is mounted a gear 10, the periphery of which is in engagement with the hub of a wheel 11 carried by a film-controlling shaft 12, one end 13 of which extends through the camera-casing and adapted to receive a crank 14, whereby said shaft may be rotated by the shop management expert 15.

Mounted on the shaft 12, intermediate of its ends, is a pinion 16, and with this meshes a gear 17 carried by a shutter-actuating shaft 18 journaled in the framework 9 and camera-casing, as shown. The outer end 19 of the shaft 18 is adapted to receive a crank or wheel (not shown) when it is desired to rotate the film-controlling shaft 12 at a different speed, and which crank or wheel may be operatively connected with any suitable motor or other power-device. The gear 17 has a bevel-gear 20 attached to it, as shown, and with which meshes a corresponding gear 21 mounted on a stub-shaft 22 suitably journaled, as shown, and upon which is mounted a shutter 23, in the usual manner. The shaft 18 is also provided with a second bevel-gear 24, and with this meshes a corresponding gear 25 mounted at the lower end of a spindle 26 suitably journaled, as shown, and carrying, at its upper end, a ball or other form of governor 27, whereby the speed of rotation of the shutter-shaft, etc., may be utilized to control certain instrumentalities presently to be described.

Disposed within the camera-casing 4, and to the rear of the mechanisms just described, is a partition 28 provided with a central opening 29 of any preferred form, and a smaller aperture 30. As usual, the film 5 is arranged back of this partition and is held in proper juxtaposition thereto by the guide-rollers 31, 31 carried by brackets 32. As usual, the opening 29 will be in proper relative line with respect to the shutter 23 and lens-holder 33.

Arranged in such position that their peripheries will overlap the aperture 30, is a series of juxtaposed disks or dials 34, 35, and 36, each made of some suitable transparent material. As shown, these disks are of relatively different diameters, that marked 34 being the smallest; that marked 35 being somewhat larger, and that marked 36 being still larger. The latter, as shown, extends entirely over the aperture 30, the disk 35 a somewhat less distance, and disk 34 only slightly thereover. None of these disks, however, extend over the opening 29. The disk 34 is fast on a shaft 37; the disk 35 is mounted on a hollow shaft 38 which encircles the shaft 37; and the disk 36 is also carried by a hollow shaft 39 which encompasses the hollow shaft 38—all as clearly shown in Figs. 5 and 6. These shafts are operated by suitable mechanism (not shown) of a stop-clock 40, and as is well understood. The three disks or dials correspond, respectively, to the hour-hand, minute-hand, and second-hand, of a stop-clock, and are actuated in the same manner. The hour-disk 34, therefore, bears the hour-designations, as shown in Figs. 5 and 6; the minute-disk 35 has imprinted on it the minute-designations, and the second-disk is marked with second-designations. These designations, on each disk, are of course arranged equidistantly, and in a manner, on each disk, to aline with those on the proximate disks. It will now be seen, and especially by referring to Fig. 4, that when these designations aline, they will register with the opening 30 in the partition-plate 28. When in such register, the several designations will be reproduced on the film, as shown in Figs. 7 and 8, in conjunction with the picture, but so far removed from the picture as not to obscure or obliterate any portion of it.

I have already referred to the governor 27. To this, by means of a bell-crank-lever 41, I connect the clock-controlling actuator 42, in order that, when the shutter-shaft 18 has attained a certain predetermined number of rotations, it will operate the governor, and this in turn will rock the lever 41 to actuate the actuator 42, whereby the disks are set in motion.

In view of the foregoing, a brief explanation of the operation of the structure will suffice: Assuming that the kinematograph machine has been properly positioned adjacent the workman or machine to be photographed, and that everything is in readiness for the operation or movement to be observed, the expert or some employee will operate the machine, in the usual manner to actuate the film-feed and the shutter. When the shutter-shaft 18 has reached the proper speed of rotation, the time-indicating disks will be thrown into operation, and, as each picture is produced on the film by the lens in the holder 33—and as controlled by the shutter 23, the hour, minute and second-designations will likewise be produced on the film through the aperture 30. As soon as the camera operator stops the machine, the feeding of the film will be arrested and the stop-clock thrown out of connection, so that movement of the time-disks will cease. When, thereafter, the film is placed in a projecting apparatus, in the usual manner, the time-indications will appear in conjunction with each picture. As the disks will, preferably, be so arranged that the operation will begin when the time-designations are in their initial positions, it will be seen that, not only will such time-indications appear on the film; but the elapsed time will have been measured and, thus, indicated. For instance, if the disks begin to register when the hour-disk and minute show 12 o'clock, for instance, and the second-disk is showing 60—as illustrated in Fig. 7—and the operation ceases when the minute-disk indicates 10, and the second-disk indicates 45, it will be seen by the shop management expert that the operations or movements under observation have taken ten minutes and forty-five seconds and, also, that the observation had begun at twelve o'clock and ended at ten minutes and forty-five seconds after twelve. In this manner, therefore, I am enabled to measure the elapsed time—between commencing the observation and its conclusion—and simultaneously produce an indication thereof on the film and, this, without the necessity of an expert to observe and also to compute the elapsed time. By these means, therefore, the expert secures an accurate notation, unaffected by any extraneous distraction, etc., and, thus, a permanent notation, not only of the observed operation, but, also, of the time consumed by the workman in performing.

In lieu of mounting the stop-clock and the time-disks within the camera-casing, in the manner already described, I may, as shown in Fig. 9, dispose the same outside of said casing. In this instance, the clock (marked 40ᵃ) would be suitably mounted on the casing so that the time-disks would be adjacent to the lens-holder and have their peripheries overlapping one end of a thimble 43, the other end being in front of the shutter 23. Arranged in line with the thimble 43, and at the opposite side of the shutter, is a tubular member 44, having its inner portion tapered, as shown, and supported in the partition 28 through which it penetrates. Disposed within the tubular member is a reducing lens 45. By this means, the indications on the three disks, 34ᵃ, 35ᵃ and 36ᵃ will be projected onto the film 5 and appear as shown in Fig. 11. The shutter 23, in this instance, would of course alternately open and close the view through the tubular member, the same as it controls the opening 29 in the partition 28. This form of structure is adaptable to existing kinematographs with only slight changes in the latter.

My invention also contemplates carrying this idea forward in the form or embodiment illustrated in Figs. 12, 13 and 14. Herein, in lieu of marking the transparent dials with indications of the kind already described, I make the disks of the same diameter and mark the disk 34$^b$ with numbers running from 0 to 9 (as in Fig. 14); disk 35$^b$ is marked with numbers 1 to 12 (as in Fig. 13) and disk 36$^b$ is marked with gear-indications and with a plurality of series of numbers 1, 2 and 3. When the disks are positioned to cause the numbers on each to register those on the others, a combination-designation will be produced which will indicate a year, a month and a day. For instance, and as shown, when the numeral 1 on disk 34$^b$ is registered with the numeral 3 on disk 36$^b$, and with the numeral 12 on disk 35$^b$, the combination-designation will be 12—31—1911, or, in other words, December 31st, 1911. Therefore, by these instrumentalities, in lieu of producing designations of an hour, minute and second, the production will be of a year, a month and a day. This enables me to utilize these instrumentalities to produce a particular date on a film or plate; hence, I may employ this structure in an ordinary camera to effect an indication on a film or sensitized plate—and, thus, on a picture—of the particular date on which the picture was taken. In this instance, I may dispense with the clock-mechanism for operating the dials or disks and actuate them in any other manner, as for example, manually. In other words, when a particular subject or object is to be photographed, the disks would be manually turned to expose the proper date. Then this date would be produced on the film or plate—the disks being arranged, to effect this result, in the manner already explained in connection with the other described embodiments of the invention.

It will now be seen that the particular forms and kinds of instrumentalities may be modified to a considerable extent without departing from the spirit of the invention and, therefore, I do not limit myself to details of construction, but claim broadly herein the feature of producing, by a camera or kinematograph provided with instrumentalities (mounted inside or outside thereof) time-designations on a sensitized medium so that, when reproduced, such designations will appear; and, in the instance of an operation or movement or series of operations or movements, a measurement of the elapsed time is effected and, simultaneously therewith, an indication produced of the measured elapsed time.

Having thus described my method, the apparatus for carrying the same into effect, and the mode of operation thereof, what I claim and desire to secure by Letters-Patent is:

1. A method utilized in connection with shop management which consists in successively photographing the successive movements or operations to be examined and simultaneously measuring and then effecting an indication of the measured elapsed time of or between the successive movements or operations.

2. A method utilized in connection with shop management which consists in successively photographing a series of movements or operations and measuring and then effecting, at predetermined periods, an indication of the measured elapsed time of or between said movements and operations.

3. A method utilized in connection with shop management which consists in reproducing in photographic form a plurality of series of successive movements or operations and, in conjunction therewith, measuring the elapsed time between the series or between the successive movements or operations, and, finally, effecting an indication of such measured elapsed time.

In testimony whereof I affix my signature in presence of two witnesses.

CHARLES B. BREWER.

Witnesses:
CHAS. E. RIORDON,
EDMUND H. PARRY.